US006963927B1

(12) United States Patent
Lee et al.

(10) Patent No.: US 6,963,927 B1
(45) Date of Patent: Nov. 8, 2005

(54) METHOD AND APPARATUS FOR COMPUTING THE SHORTEST PATH BETWEEN NODES BASED ON THE BANDWIDTH UTILIZATION LINK LEVEL

(75) Inventors: Ted Chongpi Lee, Holmdel, NJ (US); Chin-Yeh Chi, Holmdel, NJ (US); Chinh Q. Le, Bridgewater, NJ (US); Arun K. Rai, Piscataway, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 820 days.

(21) Appl. No.: 09/650,287

(22) Filed: Aug. 29, 2000

(51) Int. Cl.[7] ........................ G06F 15/173; G06F 11/00

(52) U.S. Cl. ....................... 709/241; 370/238; 370/351; 709/238

(58) Field of Search ................................. 709/238–241, 709/223; 370/238, 351; 376/256; 716/13

(56) References Cited

U.S. PATENT DOCUMENTS

| | | | | | |
|---|---|---|---|---|---|
| 4,905,233 | A | * | 2/1990 | Cain et al. | 370/237 |
| 5,233,604 | A | * | 8/1993 | Ahmadi et al. | 370/238 |
| 5,410,586 | A | * | 4/1995 | Davies | 379/14 |
| 5,600,638 | A | * | 2/1997 | Bertin et al. | 370/351 |
| 5,872,773 | A | * | 2/1999 | Katzela et al. | 370/256 |
| 5,884,037 | A | * | 3/1999 | Aras et al. | 709/226 |
| 6,256,309 | B1 | * | 7/2001 | Daley et al. | 370/395 |
| 6,321,271 | B1 | * | 11/2001 | Kodialam et al. | 709/241 |
| 6,347,078 | B1 | * | 2/2002 | Narvaez-Guarnieri et al. | 370/230 |
| 6,584,071 | B1 | * | 6/2003 | Kodialam et al. | 370/238 |

FOREIGN PATENT DOCUMENTS

| | | | | |
|---|---|---|---|---|
| EP | WO 95/31058 | * | 11/1995 | H04L/12/44 |

OTHER PUBLICATIONS

Efficient Precomputation of Quality–of–Service Routes, Anees Shaikh, Jennifer Rexford, Kang G. Shin (1998), pp. 1–13.*

Quality of Service Routing: A performance Perspective, Apostolopoulos, G., Kamat, S., Guerin, R., Tripathi, S. IEEE, ICNP, 1998, pp. 1–12.*

Load Balancing for variable sized connection with dynamically changing bandwidth requirments, IBM Technical Disclosure Bulletin, Oct. 1992, v. 35, Issue #5, pp 435–438.*

On Path selection for traffic with Bandwidth Guarantees, Ma, Q., Steenkiste, P., pp. 1–12.*

Network Working Group, RFC 2676, QOS Routing Mechanisms and Open Shortest Path First (OSPF), Apostopoulos, G. et. al Aug. 1999, pp. 1–50.*

* cited by examiner

*Primary Examiner*—Beatriz Prieto

(57) ABSTRACT

A method and apparatus for determining a circuit path between a source node and a destination node within a network comprising a plurality of nodes by iteratively selecting appropriate next nodes using a shortest path algorithm and accepting or rejecting the selected next node based upon the bandwidth utilization level of the communications link to the next node. In the case of a lack of acceptable communication links or a determined circuit path exceeding an ideal circuit path by a predetermined amount, the threshold levels defining acceptable links are adjusted.

14 Claims, 4 Drawing Sheets

100

METHOD AND APPARATUS FOR COMPUTING THE SHORTEST PATH BETWEEN NODES BASED ON THE BANDWIDTH UTILIZATION LINK LEVEL

TECHNICAL FIELD

The invention relates to the field of communications systems and, more specifically, to an adaptive/iterative load-balancing method suitable for use in network management systems providing automatic route provisioning and/or manual route provisioning.

BACKGROUND OF THE INVENTION

Telecommunication networks and other networks are increasing in both size and complexity. It is anticipated that this trend will continue such that very large telecommunications networks having tens of thousands of nodes will become increasingly commonplace. Unfortunately, as such networks increase in size, the network management function also increases in complexity. This means that critical tasks such as provisioning (allocating resources to form a communications link), restoration, reinstatement and the like, must be completed in a reasonable time using network management tools available to a network manager at a single location.

In a manual provisioning mode, an operator specifies all details of a circuit such as end points, all links, time slots, and all network elements. The manual provisioning mode allows the operator to select a particular circuit providing a communication circuit for DS-1, DS-3, EC-1, OC-3 and other communications services. However, the manual provisioning mode is slow (the operator must select all links manually) and error prone (the operator may make an error in selecting these links).

In an automatic provisioning mode, the operator specifies end points (i.e., start node and end node) and type of circuit needed to provide the desired communication. A network manager system responsively examines all of the spare resources available in the network and selects the optimum path for the requested circuit. This automatic provisioning mode requires the identification of all spare resources such as channels and communication links from the data base, the constructing of a graphical or other depiction of the spare resources within computer memory and the execution of a shortest path algorithm to find the optimum route.

Within a telecommunications network comprising many network elements (NEs) or nodes, it is desirable to balance the network traffic such that the network elements or nodes are not over utilized. Unfortunately, provisioning algorithms do not properly account for system-wide network element loading levels. That is, present provisioning algorithms tend to over utilize some nodes and under utilize other nodes while attempting to provide a "shortest path" for provisioned circuits.

Therefore, it is seen to be desirable to provide a method for provisioning a circuit in a manner that avoids over utilizing network elements or nodes. Additionally, it is seen to be desirable to adapt automatic provisioning and/or manual provisioning techniques in a manner that avoids over utilizing network elements or nodes.

SUMMARY OF THE INVENTION

The invention comprises a method and apparatus for provisioning a circuit in a manner that avoids over utilizing or overloading communications links between network elements (NEs) or nodes within a telecommunications or other network.

Specifically, a method according to one embodiment of the invention comprises the step of: iteratively defining a circuit path between a source node and a destination node in a network comprising a plurality of nodes interconnected by links, where each link has associated with it a respective bandwidth utilization level, and where the links having bandwidth utilization levels exceeding a threshold level are not used to define the circuit path.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

The subject invention will be described within the context of a telecommunication system comprising a large number of network elements or nodes interconnected in a mesh topology. However, it will be appreciated by those skilled in the art that the subject invention may be advantageously employed in any communications network in which provisioning of any form of communication may be utilized, such as telecommunication, data communication, streaming media communication and the like. Thus, it is contemplated by the inventors that the subject invention has broad applicability beyond the telecommunication network described herein.

Provisioning (manual or automatic) comprises the process of selecting the start and end points (nodes) of a communication path, selecting all the nodes and links connecting the start and end nodes, finding the "best" communication path between the start and end nodes, and generating the commands to each of the nodes within the "best" path such that cross-connects within the network cause the path to be formed, thereby enabling traffic flow through the provisioned circuit. It is noted that each link typically comprises a plurality of channels, and that each channel typically has time slots that can be reserved.

The provisioning of a circuit is a network management layer function within the telecommunications management network (TMN) standards, described in more detail in International Telecommunications Union (ITU) standard documents such as recommendation M.3010 and related documents, which are incorporated herein by reference in their entireties. It is noted that the TMN functional layers also include a service management layer which is above, and interacts with, the network management layer. Therefore, in the case of TMN management at the service management layer, the network management layer functions may not be performed manually.

Figure 1:
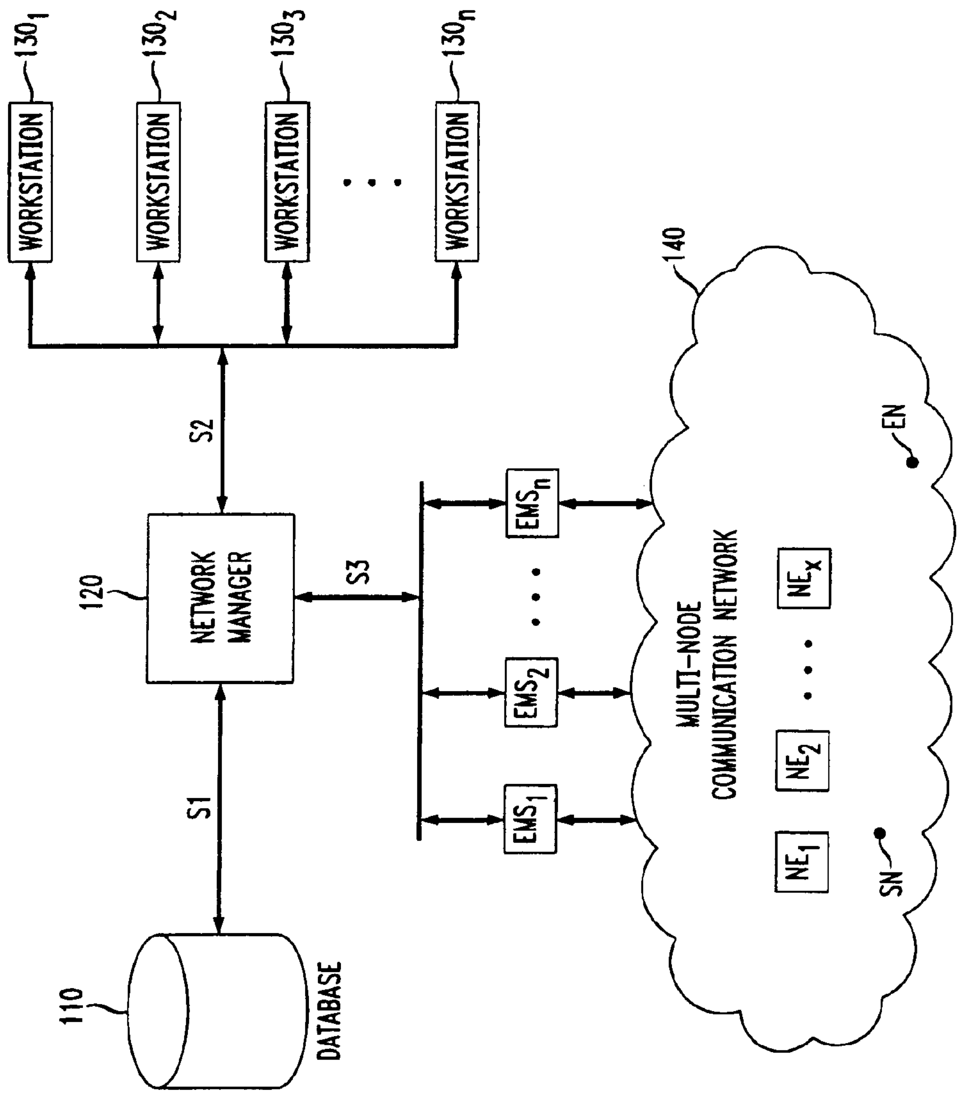
FIG. 1 depicts a high level block diagram of a communications system.

FIG. 1 depicts a high level block diagram of a communications system. Specifically, the communications system 100 of FIG. 1 comprises a database 110, a network manager or controller 120, a plurality of work stations $\mathbf{130}_1$ through $\mathbf{130}_n$ (collectively work stations 130), a communications link 134 and a multi-node communication network 140.

The multi-node communication network 140 comprises a plurality of network elements (NE) denoted as network elements $NE_1$ through $NE_x$ (collectively network elements NE). Also depicted is a start-node SN and an end-node EN. As will be discussed in more detail below with respect to FIGS. 3 and 4, the invention operates to determine the shortest path between a source (start) node and a destination (end) node for provisioning a circuit in a manner that adapts to the bandwidth utilization or "loading" placed upon each link connecting the source node, destination node, and intervening nodes. In this manner, the invention operates to insure that each link within the provisioned circuit is operating at a loading level below a threshold value. It is noted that the threshold level may be adapted (i.e., increased or decreased) in response to, for example, calculated circuit paths being too long (e.g., a calculated circuit path comprising 50% more nodes than a circuit path calculated without respect to link loading conditions).

The multi-node communication network 140 is coupled to the network manager 120 via signal path S3. The network manager or controller 120 is used to manage various network operations such as the routing of communications and other functions. Specifically, in one embodiment, the multi-node communication network 140 comprises a large number of network elements where each communication to be transmitted from a start network element or start-node to an end network element or end-node requires the determination by the network manager 120 of an appropriate communications path.

The database 110 may comprise a standard mass storage device, such as a redundant array of inexpensive devices (RAID) or other known mass storage device cooperating with a data base program such as the Oracle data base provided by Oracle Corporation of Redwood Shores, Calif. All that is necessary is that the database 110 be able to communicate with the network manager 120 in a manner facilitating the storage and retrieval of information, such as characterization and control information pertaining to the multi-node communication network 140 including loading information regarding the various links interconnecting the nodes in the network. In one embodiment of the invention, the data base 110 stores information pertaining to each node within the multi-node communication network 140 and, more particularly, to the type of links connecting the nodes, the type of channels provided by these links and the loading or bandwidth utilization of the respective links and/or channels. The data base 110 also stores information pertaining to the availability of time slots for the various links and/or channels used to communicate between nodes.

Each of the work stations 130 communicates with the network manager 120 via, for example, a computer network. It will be appreciated by those skilled in the art that more or fewer work stations 130 may be provided.

Each of the work stations 130 may comprise, for example, a terminal used by a network operator to request the provisioning of communication circuits between start-nodes and end-nodes in response to, for example, requests for such circuits from network users. The work stations 130 may also comprise interfaces between network system users and customers and the network manager 120. Within the context of the present invention, the work stations 130 are used to provide information to the network manager or controller 120 indicative of at least the start node and end node of a circuit to be provisioned, as well as any quality of service (QOS) or other transmission parameters associated with that circuit. Broadly speaking, all that is necessary to practice the present invention is a communication from some entity, such as a work station 130, indicative of the start node and end node of a circuit to be provisioned.

The network manager 120 and database 110 of the communications system 100 of FIG. 1 are depicted as separate functional entities. However, it will be appreciated by those skilled in the art that the network manager 120 and database 110 may be combined within a single functional entity. Thus, the network manager 120 and database 110 may be operably combined to form a network management apparatus suitable for managing the multi-node communication network 140 according to the present invention.

In one embodiment, the network manager 120 comprises, illustratively, an Integrated Transport Management Network Manager (ITM-NM) manufactured by Lucent Technologies, Inc. of Murray Hill, N.J. In this embodiment, the network manager 120 implements network management layer functions according to, for example, the Telecommunications Management Network (TMN) standards described in the International Telecommunications Union (ITU) recommendation M.3010 and related documents, which are incorporated herein by reference in their entirety. Thus, the network manager 120 is used to manage all network elements within the communications system 100 of FIG. 1, both individually and as a set of network elements. The network manager 120 can include or be operatively coupled to various element management systems $EMS_1$ through $EMS_n$ (collectively the element management systems EMS) according to the various management layer functions described in the TMN standard.

Figure 2:
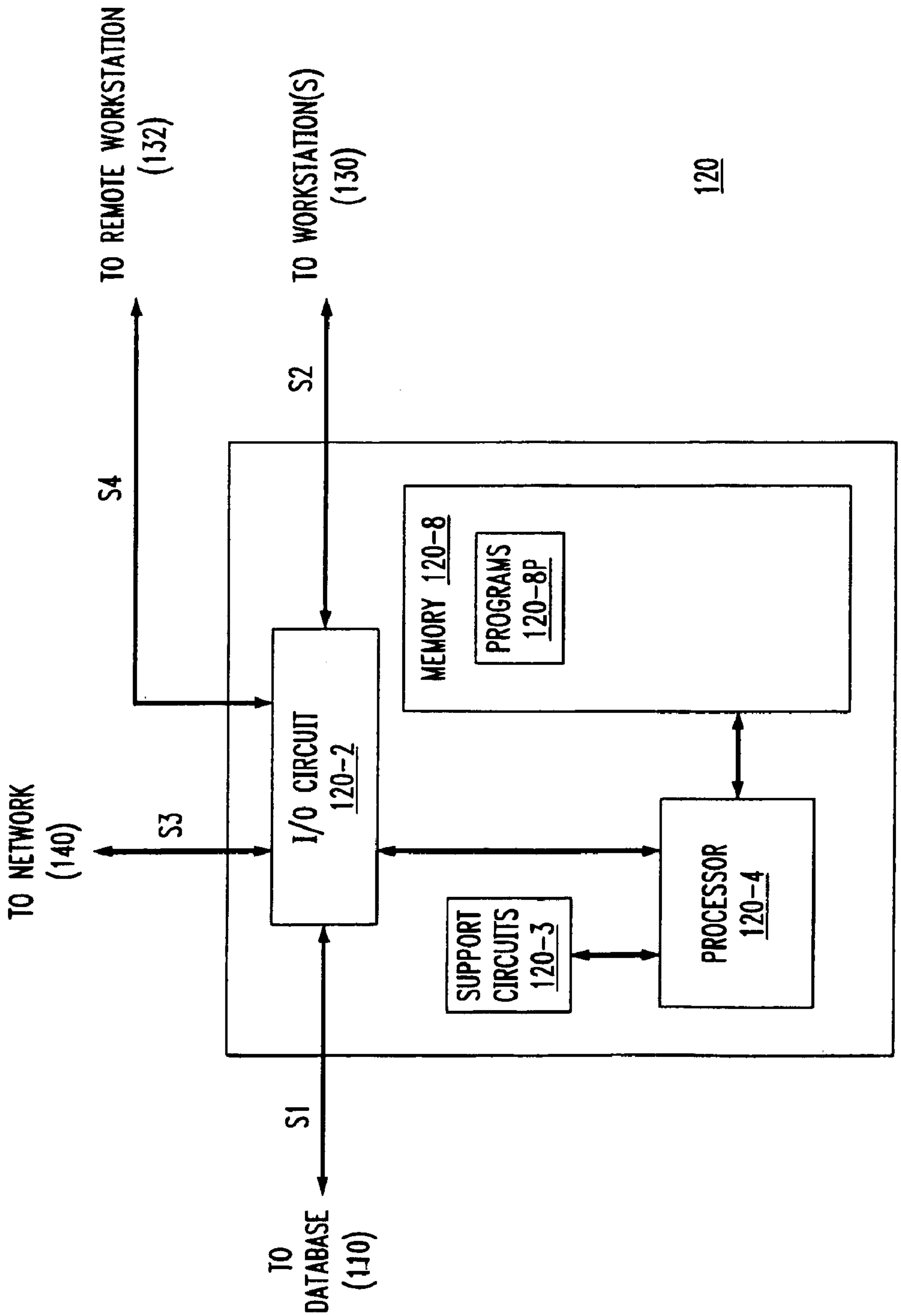
FIG. 2 depicts a high level block diagram of a network manager suitable for use in the communications system of FIG. 1.

FIG. 2 depicts a high level block diagram of a network manager or controller suitable for use in the communications system 100 of FIG. 1. Specifically, the exemplary network manager or controller 120 of FIG. 2 comprises a processor 120-4 as well as memory 120-8 for storing various network management and control programs 120-8P. The processor 120-4 cooperates with conventional support circuitry 120-3 such as power supplies, clock circuits, cache memory and the like as well as circuits that assist in executing the software routines stored in the memory 120-8. As such, it is contemplated that some of the process steps discussed herein as software processes may be implemented within hardware, for example, as circuitry that cooperates with the processor 120-4 to perform various steps. The network manager 120 also contains input-output (I/O) circuitry 120-2 that forms an interface between the various functional elements communicating with the network manager 120. For example, in the embodiment of FIG. 1, the network manager 120 communicates with a database 110 via a signal path S1, each of a plurality of work stations 130 via signal path S2 and the communication network to be managed 140 via signal path S3.

Although the network manager 120 of FIG. 2 is depicted as a general purpose computer that is programmed to perform various network management functions in accordance with the present invention, the invention can be implemented in hardware as, for example, an application specific integrated circuit (ASIC). As such, the process steps described herein are intended to be broadly interpreted as being equivalently performed by software, hardware, or a combination thereof.

The network manager 120 of the present invention communicates with the various work stations 130 such as those being used by network operators servicing customers requesting specific connections.

Figure 3:
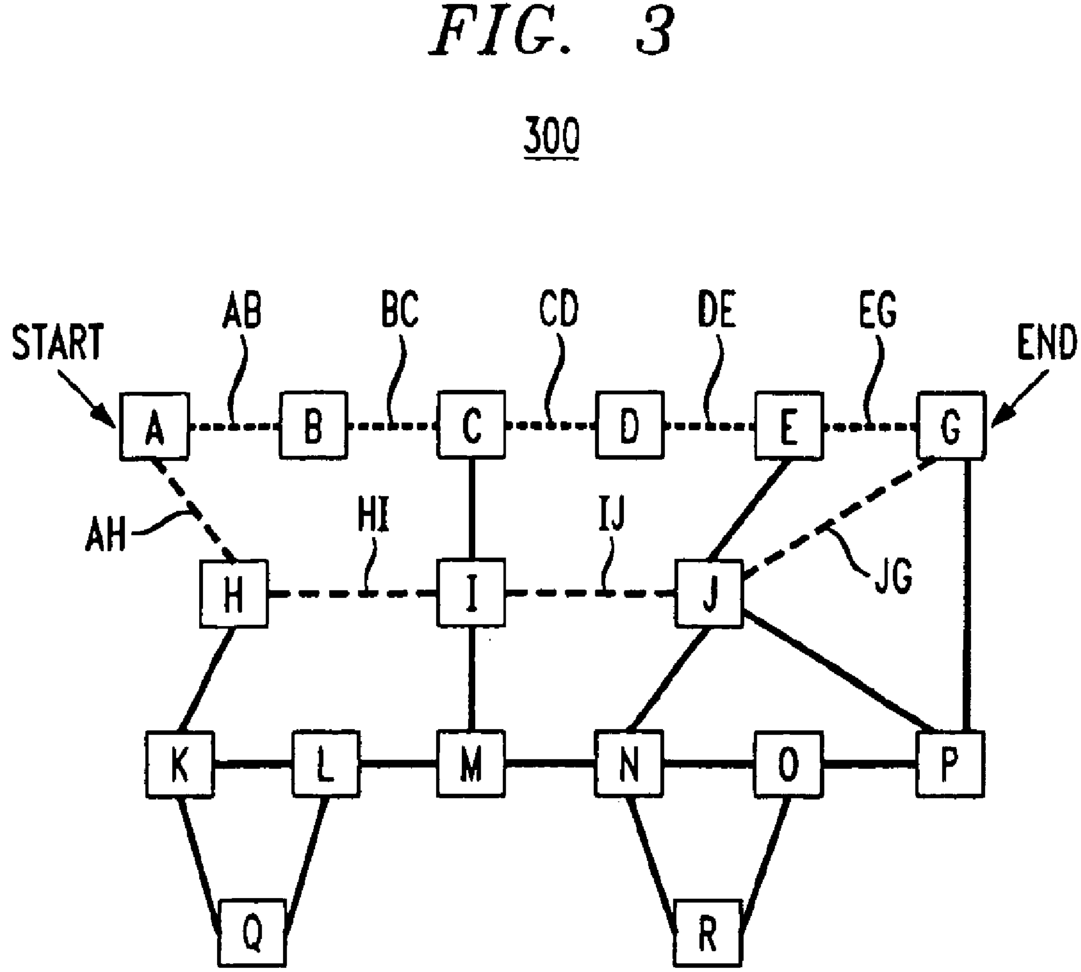
FIG. 3 depicts a graphical representation of a source node, an end node and a plurality of intervening nodes within a network.

FIG. 3 depicts a graphical representation of circuit comprising a source node, an end node and a plurality of intervening nodes within a network. Specifically, FIG. 3 depicts a network 300 comprising a plurality of nodes denoted as nodes A through R. Circuit paths or links exist between some of the nodes, but not all of the nodes (though each node is coupled to at lest two other nodes). Circuit links are denoted by two letters indicative of the nodes connected by the respective circuit link.

In the network 300 of FIG. 3, a circuit is to be provisioned between a start node (node A) and an end node (node G). The shortest path between nodes A and G is the path through the following nodes A-H-I-J-G. However, according to the invention, if the bandwidth utilization level or "load" on any of the links connecting nodes A through G has reached or exceeded a preset threshold level, such as 50% bandwidth utilization level, then another shortest or "next shortest" path is found where the load is found, such that the threshold level is honored. As depicted in FIG. 3, the next shortest path between nodes A and G is the path through nodes A-B-C-D-E-G. It is noted that the first shortest path traverses three intervening nodes (H, I and J), while the next shortest path traverses four intervening nodes (B, C, D and E). The next shortest path A-B-C-D-E-G is formed by coupling nodes A and B via path AB, nodes B and C via path BC, nodes C and D via path CD, nodes D and E via path DE, and nodes E and G via path EG.

With respect to the load balancing aspects of the invention, the threshold level for determining whether a link between the two nodes is over utilized may be predetermined or user settable. Moreover, the threshold level preferably is defined with respect to the type of link joining the two nodes. Additionally, the threshold level preferably applies to each of the digital links used to connect the start node, end node and intervening nodes.

It is noted that the threshold level is a measure for a digital link, not a measure of the aggregate of links between two nodes. That is, the threshold level is applied to the specific digital link between two nodes contemplated to be used within the provisioned circuit. Where multiple links between two nodes exist, alternate links may be used or the multiple links may have associated with them different threshold levels, depending on the technology used to provide each link. In this manner, the "shortest path" algorithm and threshold level comparison are used in an iterative fashion whereby each link determined to be appropriate according to the shortest path algorithm is compared to a corresponding threshold level to determine if the link is, in fact, appropriate with respect to the bandwidth utilization level of the link. If the link is over utilized or otherwise inappropriate, then a different link may be selected for use in the shortest path algorithm. In this manner, those links following an inappropriate or over utilized link do not have to be processed by the shortest path algorithm.

Figure 4:
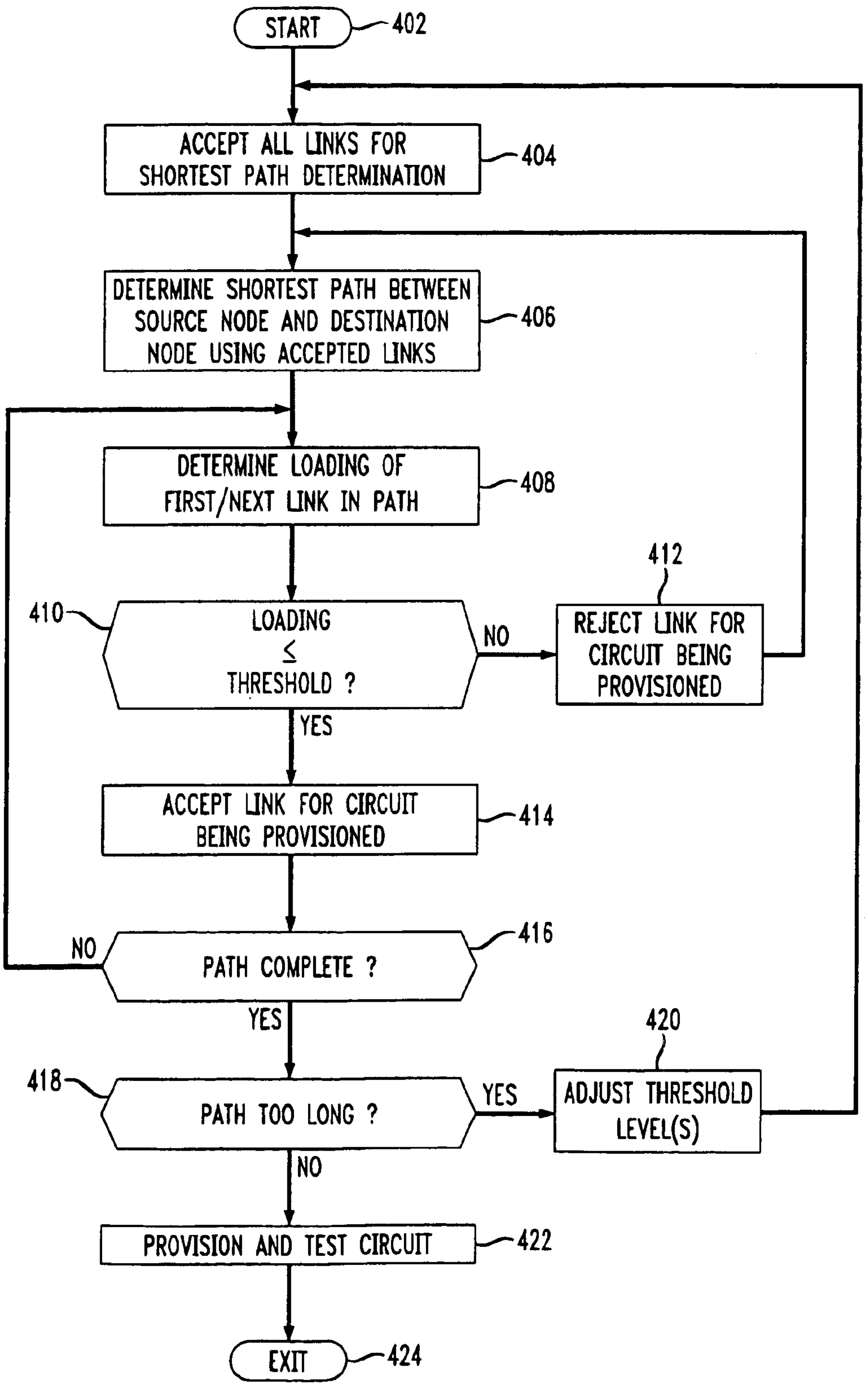
FIG. 4 comprises a flow diagram of a method of selecting a load-balanced shortest path according to an embodiment of the invention.

FIG. 4 comprises a flow diagram of a method of selecting a load-balanced shortest path according to an embodiment of the invention. Specifically, the method 400 of FIG. 4 utilizes existing shortest path algorithms in an iterative fashion such that each link of a proposed shortest path is checked for loading prior to inclusion within a provision circuit.

The method 400 of FIG. 4 is entered at step 402 and proceeds to step 404, where all links for a shortest path determination are accepted. That is, at step 404, none of the possible or acceptable links used to provide a circuit path between a source node and a destination node are excluded from consideration by the shortest path algorithm. The method 400 then proceeds to step 406.

At step 406, at least one link of the shortest path between the source node and the destination node is determined using the presently accepted links. In one embodiment of the invention, only a single link (i.e., a next link) extending from the node connected to a previously processed link is determined. In another embodiment of the invention, a larger portion or an entirety of a "shortest path" between the node connected to the processed link and the end node is determined. In the case of step 406 being executed for the first time to determine an entire path, the determined shortest path comprises a "ideal" shortest path. This ideal shortest path comprises the shortest path between the start node and the end node based primarily on the topology of the network and excluding any consideration of the bandwidth utilization levels of the links used to provide such path. The method 400 then proceeds to step 408.

During the process of constructing an acceptable shortest path between the source node and the destination node, a presently calculated "acceptable" path is formed beginning with the source node and proceeding toward the destination node. During the formation of this path, the last or terminal node of a path so formed comprises the last node of a path connected to the source node via one or more accepted links. It is noted that for each iteration of the method, a single next link (coupling the terminal node to a next node) and a plurality of next links (coupling the terminal node to a respective plurality of next nodes or an entire group of links necessary, to couple the terminal node to the destination node via as many intervening nodes and links as necessary) may be provided.

At step 408, the loading of the first or next link in the calculated shortest path is determined. That is, if step 408 is being executed for the first time, then the loading of the first link in the determined shortest path is determined. The first link comprises a link between the source node and the first node within the determined shortest path. If step 408 has been previously executed, then the next link loading is determined. For example, in the case of step 408 being executed for the second time, the next link comprises the link bridging the node connected to the first link and the next node. The method 400 then proceeds to step 410.

At step 410, a query is made as to whether the loading of the link determined at step 408 is less than or equal to a threshold level, such as 30%, 50%, 70%, 100% or some other value. If the query at step 410 is answered affirmatively, then the method 400 proceeds to step 414. If the query at step 410 is answered negatively, then the method 400 proceeds to step 412.

At step 412, the link having a loading determined at step 408 is rejected for consideration for the circuit being provisioned. The method 400 then proceeds to step 406, where the shortest path between the source node and destination node is determined using accepted links. The second and subsequent executions of step 406 may utilize the links already determined to have loading levels below their respective threshold levels or by recalculating the entire circuit path. Preferably, the method of the present invention is performed by recalculating the shortest path using links that are known to be loaded below their respective threshold levels.

At step 414 the link having a loading level determined at step 408 is accepted for use in the circuit being provisioned.

The method 400 then proceeds to step 416, where a query is made as to whether the path is now complete. That is, at step 416, a query is made as to whether the link accepted at step 414 comprises the final link between a penultimate node and the destination or end node. If the query at step 416 is answered negatively, then the method 400 proceeds to step 408. If the query at step 416 is answered affirmatively, then the method 400 proceeds to step 418.

At step 418, a query is made as to whether the path of the circuit defined by the iterative process described above with respect to FIGS. 406 through 416 is too long. For example, if the path completed using the iterative process is greater than 40%, 50%, 60%, 100% or some other percentage (or distance, latency or other metric) longer than an initially determined or "ideal" shortest path (i.e., a shortest path between the source node and destination node determined without regard to loading), then the path may be deemed to be too long. If the query at step 418 is answered affirmatively, then the method 400 proceeds to step 420. If the query at step 418 is answered negatively, then the method 400 proceeds to step 422.

At step 420, the threshold levels of one or more of the links are adjusted. That is, assuming that a default threshold level of 50% loading has been used to accept or exclude links for purposes of provisioning a circuit and that the resulting circuit path has been deemed to be too long at step 418. In this instance, the threshold level applied to one or more of the links may be increased (or decreased) to any level up to 100%. The actual increase in threshold level is preferably made by examining the type of links available for use in provisioning a circuit and modifying the threshold levels accordingly. It should be noted that the threshold level for each of the links between intervening nodes need not be the same, and that individual threshold levels, groups of threshold levels, or the entirety of the threshold levels associated with the links interconnecting the intervening nodes may be adjusted. The method 400 then proceeds to step 404. If the query at step 418 is answered negatively, then the method 400 proceeds to step 422 where the circuit is provisioned and tested. The method exits at step 424.

An example of threshold level adjustment (per step 420) will now be discussed. Assume that an OC-3 digital link is configured as 3DS/3 links. In this instance, the threshold levels for the link can be one or two DS3s, which equates to a threshold level of 33% and 67%, respectively. If the threshold level is set at 50%, then only one of the three DS-3 links may be deployed to meet the load-balancing threshold. If the threshold level is raised to 75%, then two of the three DS-3s may be deployed. If the threshold level is 100%, then all three DS-3s may be deployed. Similarly, if an OC-3 digital link is configured as two DS-3s and 28 DS-1s, the threshold for DS-3 can be one or two DS-3s, while the threshold for the DS-1 links can be 1 to 28 DS-1s. If the OC-3 digital link is configured for a single DS-3 and 56 DS-1s, then the threshold level for the DS-3 is one (i.e., 100%), while the threshold for the DS-1s may be 1 to 56 DS-1s. If the OC-3 digital link is configured as 84 DS-1s, then the threshold level may be set as 2 to 83 DS-1s, and there is no DS-3 available. In each of these examples, it is noted that the "granularity" of the threshold level is determined with respect to the type of digital link used and the configuration of that digital link. Thus, in determining threshold levels to be used in comparing loading levels at step 410, it is important to understand the type of digital links offered by the network and the configuration of those digital links.

Although various embodiments which incorporate the teachings of the present invention have been shown and described in detail herein, those skilled in the art can readily devise many other varied embodiments that still incorporate these teachings.

What is claimed is:

1. A method, comprising iteratively defining a circuit path between a source node and a destination node in a network comprising a plurality of nodes interconnected by links, where each link has associated with it a respective bandwidth utilization level, and where links having bandwidth utilization levels exceeding a threshold level are not used to define said circuit path;

determining an ideal shortest path between the source node and destination node;

comparing the ideal shortest path to the iteratively defined circuit path; and in the case of the iteratively defined circuit path exceeding said ideal shortest path by a threshold amount, adjusting said threshold level and repeating said step of iteratively defining said circuit path.

2. The method of claim 1, wherein said iteratively defined circuit path is compared to said ideal shortest path by comparing the number of intervening nodes within each respective circuit path.

3. The method of claim 2, wherein said threshold amount comprises a predetermined increase in the number of intervening nodes.

4. The method of claim 1, wherein said iteratively defined circuit path is compared to said ideal shortest path by comparing the latency within each respective circuit path.

5. The method of claim 1, wherein said iteratively defined circuit path is compared to said ideal shortest path by comparing the number of links within each respective circuit path.

6. A method, comprising:

determining a shortest path between a source node and a destination node, said shortest path comprising a plurality of intervening nodes coupled by respective links;

determining whether a respective bandwidth utilization level for each link within said shortest path is below a threshold level;

adapting said shortest path to avoid using links having respective bandwidth utilization levels above said threshold level;

determining whether a shortest path formed using links having respective bandwidth utilization levels below said threshold level exceeds an ideal shortest path by a threshold amount; and in the case of said shortest path exceeding said ideal shortest path, adjusting said threshold level and recalculating said shortest path.

7. The method of claim 6, wherein said calculated shortest path is compared to said ideal shortest path in terms of at least one of a number of nodes within said circuit paths, a latency associated with communications within said circuit paths and a number of links within said circuit paths.

8. A method, comprising:

selecting, according to a shortest path algorithm at least one link within a circuit path between a starting node and a destination node within a network comprising a plurality of nodes;

determining whether each selected link has associated with it a bandwidth utilization level exceeding a threshold level;

rejecting each selected link having associated with it a bandwidth utilization level exceeding said threshold level;

repeating said steps of selecting and determining until a circuit path between said starting node and said destination node has been determined; and increasing said threshold level in response to said determined circuit path exceeding an ideal circuit path by a predetermined amount.

9. The method of claim 8, wherein said predetermined amount comprises a difference in at least one of the number of nodes within said circuit paths, the latency associated with communications within said circuit paths and the number of links within said circuit paths.

10. The method of claim 8, wherein said step of selecting comprises the step of selecting, according to said shortest path algorithm, each link within a circuit path between a last node of a partially formed circuit path and said destination node.

11. A method for determining a circuit path between a source node and a destination node in a network comprising a plurality of nodes interconnected by links, said method comprising:

(a) selecting, according to a shortest path algorithm, an available link to a next node within said circuit path;

(b) determining if said selected link has associated with it a bandwidth utilization level below a threshold level;

(c) rejecting said selected link in the case of said respective bandwidth utilization level being below said threshold level; and (d) repeating steps (a) through (c) until a circuit path between said source node and said destination node has been determined; and (e) determining if said circuit path exceeds an ideal circuit path by a predetermined amount; and in the case of said circuit path exceeding said ideal circuit path by said predetermined amount adjusting said threshold level and repeating steps (a) through (d).

12. The method of claim 11, wherein said predetermined amount comprises a difference in at least one of the number of nodes within said circuit paths, the latency associated with communications within said circuit paths, and the number of links within said circuit paths.

13. A computer readable medium storing a software program that, when executed by a computer, causes the computer to perform a method comprising:

iteratively defining a circuit path between a source node and a destination node in a network comprising a plurality of nodes interconnected by links, where each link has associated with it a respective bandwidth utilization level, and where links having bandwidth utilization levels exceeding a threshold level are not used to define said circuit path;

determining an ideal shortest path between the source node and destination node;

comparing the ideal shortest path to the iteratively defined circuit path; and in the case of the iteratively defined circuit path exceeding said ideal shortest path by a threshold amount, adjusting said threshold level and repeating said step of iteratively defining said circuit path.

14. Apparatus comprising:

a network manager, for determining a circuit path between a source node and a destination node within a network comprising a plurality of nodes; and a data base, for storing a respective bandwidth utilization level for each of a plurality of links interconnecting said nodes;

said network manager determining said circuit path by iteratively selecting appropriate next nodes according to a shortest path algorithm, determining whether a link communicating with said selected next node has associated with it a bandwidth utilization level exceeding a threshold level, and selecting an alternative next node in the case of paid link having associated with it a bandwidth utilization level exceeding said threshold level; and in the case of a plurality of alternative next nodes having respective links with bandwidth utilization levels above said threshold level, adjusting said threshold level.

* * * * *